(12) United States Patent
Theisen et al.

(10) Patent No.: US 10,579,167 B1
(45) Date of Patent: Mar. 3, 2020

(54) SCALABLE DOT-MATRIX UI FOR WORKFLOW SUBMISSION WITH MULTI-DIMENSION VARIABLES AT DIFFERENT PRECEDENCE

(71) Applicant: Oracle International Corporation, Redwood Shores, CA (US)

(72) Inventors: Karen Theisen, Novato, CA (US); Ashutosh Gupta, Fremont, CA (US); Rajesh Easwaramoorthy, Sunnyvale, CA (US); Girish Kumar Balachandran, Fremont, CA (US); Lik Wong, Palo Alto, CA (US); Eric Sutton, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/102,492

(22) Filed: Aug. 13, 2018

(51) Int. Cl.
*G06F 3/048* (2013.01)
*G06F 3/038* (2013.01)
*G06F 3/0484* (2013.01)
*G06F 3/0481* (2013.01)

(52) U.S. Cl.
CPC .......... *G06F 3/038* (2013.01); *G06F 3/04817* (2013.01); *G06F 3/04842* (2013.01)

(58) Field of Classification Search
CPC ... G06F 3/038; G06F 3/04842; G06F 3/04817
See application file for complete search history.

*Primary Examiner* — Matthew Ell
(74) *Attorney, Agent, or Firm* — Kilpatrick Townsend & Stockton LLP

(57) ABSTRACT

Embodiments relate to dynamically defining and visually representing worker threads. More specifically, a set of parameters is defined for each of multiple worker threads, and a dot-matrix UI represents characteristics of individual parameter across worker threads to facilitate expedient configuration.

20 Claims, 8 Drawing Sheets

Submit a workflow execution for <name>. When submitted, a workflow is executed immediately. Optionally, you can schedule workflow execution at a later time or on a recurring basis. You can add workers to create parallel executions of this workflow.

* Submission Name  [WorkflowName_Timestamp]

▼ Global Inputs (37)   [⟳ Reset All Values]

Each execution of this workflow inherits the following global values. These values can be specified for individual workflow instances.

| JBoss (12) | Apache (11) | Bank App (10) | My SQL (2) | DB (2) |

[⟳ Reset All Values]

- ❓ * http_proxy_port   [8081]
- ❓ * JAVA_HOME         [/opt/oracle-jre]
- ❓ * http_node_port    [8080]
- ❓ * http_port         [80]
- ❓ http_node_ips       [ ]
- ❓ config_httpd_c      [ ]
- ❓ config_conf_d       [ ]
-  tomcat_context  [ Lorem ipsum dolor sit amet, consectetur adipiscing elit, sed do eiusmod tempor incididunt ]
- ❓ use_ajp

FIG. 2

Workflow Submission

Submit a workflow execution for <name>. When submitted, a workflow is executed immediately. Optionally, you can schedule workflow execution at a later time or on a recurring basis. You can add workers to create parallel executions of this workflow.

* Submission Name  [ WorkflowName_Timestamp ]

▲ Global Inputs (37)

▼ Workers (11)

Add workers to your workflow submission to create parallel workflow instances (one worker per workflow instance)

Add  [ 10 ] Workers Named [ DukesBankApp ]  [ Add ]  |  [ Modify Values ]   🗑  Size ○────○

[ Submit ] [ Export as JSON ] [ Cancel ]

○ Reset All Values

| | JBoss | Apache | Bank App | My SQL DB |
|---|---|---|---|---|
| ☐ DukesBankApp1 | ○○○○○○○○○○ | ○○○○○○○○○○ | ○○○○○○○○○○ | ○○ |
| ☐ DukesBankApp2 | ○○○○○○○○○○ | ○○○○○○○○○○ | ○○○○○○○○○○ | ○○ |
| ☐ DukesBankApp3 | ○○○○○○○○○○ | ○○○○○○○○○○ | ○○○○○○○○○○ | ○○ |
| ☐ DukesBankApp4 | ○○○○○○○○○○ | ○○○○○○○○○○ | ○○○○○○○○○○ | ○○ |
| ☐ DukesBankApp5 | ○○○○○○○○○○ | ○○○○○○○○○○ | ○○○○○○○○○○ | ○○ |
| ☐ DukesBankApp6 | ○○○○○○○○○○ | ○○○○○○○○○○ | ○○○○○○○○○○ | ○○ |
| ☐ DukesBankApp7 | ○○○○○[JBOSS NAME AND VERSION: [boss-5.1.01.GA] ○○○○ | ○○○○○○○○○○ | ○○ |
| ☐ DukesBankApp8 | ○○○○○○○○○○ | ○○○○○○○○○○ | ○○○○○○○○○○ | ○○ |
| ☐ DukesBankApp9 | ○○○○○○○○○○ | ○○○○○○○○○○ | ○○○○○○○○○○ | ○○ |
| ☐ DukesBankApp10 | ○○○○○○○○○○ | ○○○○○○○○○○ | ○○○○○○○○○○ | ○○ |
| ☐ DukesBankApp11 | ○○○○○○○○○○ | ○○○○○○○○○○ | ○○○○○○○○○○ | ○○ |

SCALABLE DOT-MATRIX UI FOR WORKFLOW SUBMISSION WITH MULTI-DIMENSION VARIABLES AT DIFFERENT PRECEDENCE

FIELD

Embodiments relate to dynamically defining and visually representing worker threads. More specifically, a set of parameters is defined for each of multiple worker threads, and a dot-matrix UI represents characteristics of individual parameter across worker threads to facilitate expedient configuration.

BACKGROUND

Frequently, a set of computational tasks or operations are to be performed multiple times (e.g., to process different inputs). The executions may be performed serially or in parallel and/or may use same or different processing resources. Frequently, configurations of the operations (e.g., in terms of selections of processing specifications, algorithm selection, transformations, etc.) remain consistent across the executions. However, sometimes it is desirable to separately and differentially configure individual configurations. The individual configuration present challenges with respect to avoiding errors during execution and conforming with high-level rules. Further, individually configuring each instance of the execution can be very time consuming. Thus, there is need to facilitate differential configuration of individual instances of operation executions.

SUMMARY

In some embodiments, a computer-implemented method is provided for representing operation configurations via dot-matrix visual elements. An operation data structure is accessed that identifies a set of fields for which corresponding parameters are to at least partly control a sequenced set of operations. For each implementation of multiple implementations of the sequenced set of operations and for each field of the set of fields, a parameter for the field is collected that is to be used to at least partly control the implementation. For each implementation of multiple implementations of the sequenced set of operations, a worker thread is generated that is configured to perform the implementation in accordance with the collected parameters. A dot-matrix visual element is generated that includes a set of shapes. For each shape of the set of shapes, a first position of the shape along a first dimension is indicative of a particular worker thread with which the shape corresponds and a second position of the shape along a second dimension is indicative of a particular field with which the shape corresponds. For each shape of the set of shapes, a visual property of the shape indicates whether or not a parameter associated with the particular worker thread and with the particular field is valid, whether or not the parameter is a default value or indicates both whether or not a parameter associated with the particular worker thread and with the particular field is valid and whether or not the parameter is a default value. At least one shape of the set of shapes is selectable to cause display of an interface for changing the parameter associated with the particular worker thread of the at least one shape and with the particular field of the at least one shape. The dot-matrix visual element is output.

In some embodiments, a computer-program product is provided that is tangibly embodied in a non-transitory machine-readable storage medium. The computer-program product includes instructions configured to cause one or more data processors to perform part or all of one or more methods disclosed herein. In some embodiments, a system is provided that includes one or more data processors and a non-transitory computer readable storage medium that contains instructions which, when executed on the one or more data processors, cause the one or more data processors to perform part or all of one or more methods disclosed herein.

In some embodiments, a computer-program product is provided that is tangibly embodied in a non-transitory machine-readable storage medium. The computer-program product can include instructions configured to cause one or more data processors to perform operations of part or all of one or more methods disclosed herein.

In some embodiments, a system is provided that includes one or more data processors and a non-transitory computer readable storage medium containing instructions which, when executed on the one or more data processors, cause the one or more data processors to perform operations of part or all of one or more methods disclosed herein.

BRIEF DESCRIPTION OF THE DRAWINGS

Illustrative embodiments of the present invention are described in detail below with reference to the following drawing figures:

FIGS. 2 and 3 show interfaces for defining parameters for operation execution according to an embodiment of the invention.

FIG. 5 shows a dot-matrix visual element representing worker-thread parameters according to an embodiment of the invention.

DESCRIPTION

Figure 1:
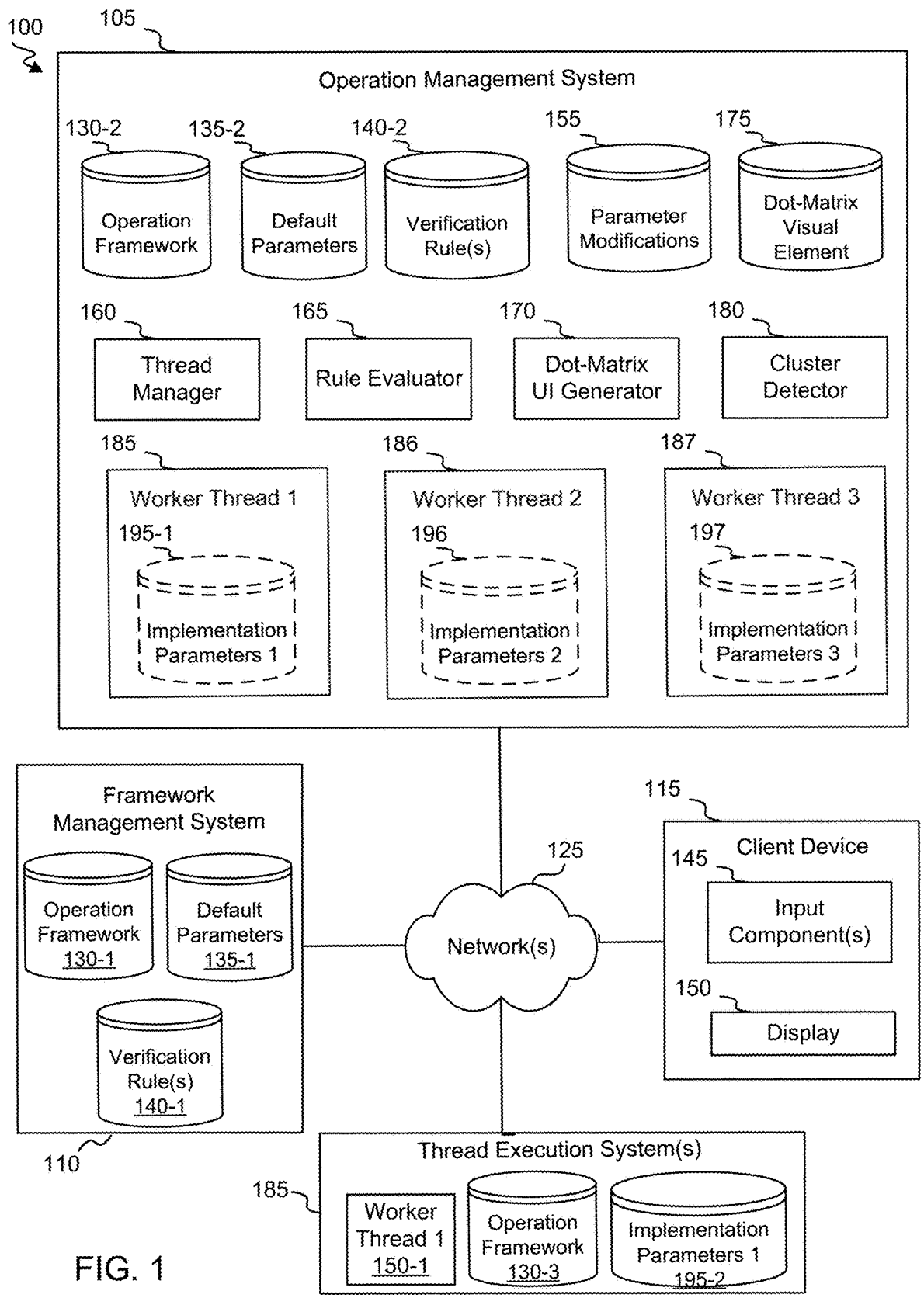
FIG. 1 shows a block diagram of an interaction system that generates and configures individual worker threads for operation execution according to an embodiment of the invention.

In some embodiments, systems and methods are provided for facilitating differential configuration of parameters across a set of worker threads. More specifically, for a given sequenced set of operations (e.g., workflow), a set of fields that at least partly control (or define) the operations is identified. Configuration specifications indicate a parameter for each of the fields and for each of the set of worker threads. A parameter may (for example) at least partly define one or more actions to be performed, a component or device that is to perform the one or more actions (e.g., via an IP address or machine name), data on which the one or more actions is to be performed (e.g., via an address for the data), and/or an action that is to be performed based on a result of a processing. A dot-matrix visual element can be generated that includes a set of dots—each representing a particular parameter for a particular worker thread. It will be appreciated that the set of dots need not have a circular shape. For example, each of the set of dots may have a circular, square, rectangular, ellipse, n-gon, quadrilateral, pentagon, hexagon, oval, triangular or other shape, and/or the set of dots may include dots of different shapes. In some instances, the shape itself may convey information corresponding to an underlying parameter (e.g., where squares represent default values and circles represent values that had been modified from default values).

The dots are arranged such that each row of dots corresponds to a single worker thread and each column corresponds to a single field (or the converse). A visual property of each dot (e.g., color, shape, size, outline width, etc.) can be indicative of a characteristic of the represented parameter (e.g., whether it is different than a default parameter for the field, whether it complies with a rule associated with the field, whether it has or is likely to result in an error or fault, or a value of the parameter). Thus, the dot-matrix visual element can convey (for example) whether each parameter for a given worker thread is compliant and error-free and/or variability or consistency of parameters across worker threads.

The dot-matrix visual element can further include or be associated with (e.g., concurrently presented with, spatially located near, etc.) one or more interactive elements to accept commands to (re)configure one or more individual worker threads and/or transform the dot-matrix visual element. A command can include a thread-generation command that indicates that one (or more) worker threads are to be generated—each to perform an iteration of the sequenced set of operations. The interactive element(s) can be configured to receive a quantity indicating a number of worker threads to be generated. Each parameter may be initially set to a default or global value (which may include a specific value or null value), and the interactive element(s) can be configured to receive an identification of a (different) parameter for each applicable field that is to replace the default or global value. The quantity of worker threads can then be configured using any received parameters and—for any field where no specific parameter was input through the element(s)—the default or global value. The (default and/or modified) parameters for each new worker thread can be characterized to identify a visual property for a corresponding dot, and the dot-matrix visual element can be updated to represent the new worker thread(s) (e.g., by adding one or more new rows).

A command can include a reconfiguring command that redefines a parameter for one or more fields. For example, one or more existing worker fields can be identified (e.g., via a selection of one or more fields), and an interactive element can be presented that accepts a definition for a given field (e.g., also specifically identified) or any of a set of fields. Upon receipt of a new parameter specification, each of the one or more worker threads can then be reconfigured to operate in accordance with the new parameter.

A command can include a sorting command that triggers a transformation of the dot-matrix visual element relative positions of worker-thread representations (e.g., rows) and/or to reposition relative positions of fields (e.g., columns). A transformation may include performing a clustering techniques so as to preferentially spatially group dots that co-vary with respect to the visual property. For example, the transformation may reorder rows to group representations of worker threads that have similar (or same) visual-property patterns across fields. As another example, the transformation may reorder columns to group representations of fields that co-vary across worker threads. As yet another example, the transformation may reorder rows based on a parameters for a given field. To illustrate, a sorting command that corresponds to an identification of a field or clicking on a column header associated with the field may cause representations of worker threads to be reordered to group worker threads based on parameter values associated with the field or ordering representations of worker threads such that the parameters monotonically increase across sequential worker-thread representations.

A command can indicate that thread configurations are finalized, which can trigger generation of a local and/or remote code instance for each worker thread (e.g., by initiating a local action or sending a configuration file and/or instruction to another device). The code instance can include definitions that correspond to the parameters defined for the worker thread (e.g., having been accepted as a default or global value or modified to another value) and further to a structure of the of the set of operations (e.g., workflow). The code instance can correspond to a self-contained execution unit that includes (for example) one or more operators, algorithms, functions, and so on. The code instance can include processing of one or more fixed variables or content items (e.g., one or more files) that cannot be configured via the dot-matrix visual element and one or more configured variables or content items (e.g., one or more operands and/or one or more files) that are defined based on the configuration represented at (and/or defined at) the dot-matrix visual element.

Worker threads (e.g., via corresponding code instances) can be configured to execute independently of each other. Worker threads can be configured to use same or different processing resources and can be configured to run on same or different computing devices. One or more thread managers may schedule execution of each of the worker threads (e.g., relative to each other and/or relative to one or more other threads) based on (for example) a load-balancing technique and/or resource availability.

FIG. 1 shows a block diagram of an interaction system 100 that generates and configures individual worker threads for operation execution according to an embodiment of the invention. Interaction system 100 can include an operation management system 105 that communicates with each of a framework management system 110, client device 115 and thread execution system(s) 120 over one or more networks 125 (e.g., the Internet, a local-area network, a wide-area network, a short-range network, etc.). Each of framework management system 110 and operation management system 105 can include one or more computing devices, servers, cloud computers, etc.

Framework management system 110 manages a set of operation frameworks (stored in an operation framework data store 130-1)—each of which defines a sequenced set of operations (e.g., a workflow) to be performed. It will be appreciated that within a particular iteration of an operation framework—each operation of the set need not be performed. For example, one operation may include a condition configured for evaluation to produce a result that indicates whether another operation (or which of multiple other operations) is to be performed. The set of operations may be performed on defined types of input data, which may include (for example) discrete values and/or files. The set of operations can include performing one or more algorithms, functions and/or data transformations. The sequenced set of operations can include an indication as to an order in which one or more operations are to be performed, though the order need not be linear or rigid. For example, a sequenced set of operations may correspond to operations for patching a database, and various patches may be applied in a variety of (e.g., which may, but need not, be temporally constrained) order. In some instances, a particular operation may be performed multiple times, and another operation may be performed between multiple instances of the operation. Each sequenced set of operations can be defined (for example) based on input from an authorized device and/or received from an authorized device. Each sequenced set of operations may be associated with permissions that indicate (for example) which devices, systems and/or users are authorized to access, configure and/or execute the sequenced set of operations.

Each operation framework can be associated with one or more default parameters (stored in a default parameter data store 135-1). Default parameters can include (for example) one or more integers, one or more real numbers, one or more text strings, one or more alphanumeric strings, one or more addresses (e.g., indicating a file destination, an IP address, a MAC address), and/or a null value. In some instances, a default parameter is defined for each parameter in an operation framework (e.g., though it may be set to a null value).

Each operation framework can be associated with one or more verification rules (stored in a verification rule data store 140-1). A verification rule can indicate (for example) a constraint on a parameter, such as a threshold or an indication that the parameter is not to be set to a null value. A verification rule can include a cross-implementation rule that indicates that a characteristic that a set of parameters for a given field are to (or are not to) have across a set of implementations (or worker threads. For example, a verification rule can indicate that parameters are to be the same across worker threads are to be unique (such that multiple worker threads are not to correspond to a same parameter value for a given field). A verification rule can relate to multiple fields, such as one that indicates that at least one of multiple fields is to be set to a non-null value or that a non-null value for a first field is required when a parameter for a second field is set to a particular value. A verification rule can be configured to be locally evaluated (e.g., based on character analysis or value comparison) or to be evaluated via communication with a remote device. A verification rule can be configured to be evaluated by performing an operation and/or querying a data structure (e.g., to determine whether one or more credential parameters are validated for worker-thread configuration). In some instances, one or more tags included in an operation framework indicate a requirement or verification rule. A tag may be associated with (for example) a given field or to generally apply across fields.

Client device 115 can send a communication to operation management system 105 (e.g., an HTTP request) that corresponds to a request to access a framework-configuration portal. For example, the request can be transmitted in response to detecting input from an input component 145 (e.g., mouse, touchpad, keyboard and/or keypad) that corresponds to the request for a particular webpage, intranet page and/or app page. Operation management system 105 can verify that such access is authorized (e.g., based on an assessment of login information, an IP address, etc.). Operation management system 105 can then retrieve data (e.g., from a library) that corresponds to each of one or more operation frameworks. For example, a set of operation frameworks represented in the retrieved data can corresponding to a patching operation framework, cloud-based application, VM-base operation framework, and so on. The retrieved data can include one or more frameworks, default parameters and/or verification rules. Retrieving the data can include transmitting a request for the data to framework management system 110 and/or retrieving the data from one or more local data stores (e.g., operation framework data store 130-2, default parameters data store 135-2 and/or verification rule data store store 140-2), which can be periodically and/or repeatedly updated using a push or pull technique.

Operation management system 105 can generate a communication (e.g., HTML response) that includes a representation each of one or more operation frameworks (e.g., including a name, description, author, etc. for each of the one or more operation frameworks) and transmit the communication to client device 115. Client device 115 can use the communication to generate an interface that includes the representation(s) and can present the interface at a display 150. Client device 115 can detect an input corresponding to a selection of a particular operation framework and can transmit a communication representing the selection (e.g., via another HTML request) to operation management system 105. The selection can initiate a process for configuring independent worker threads to execute the operation framework across a cloud or on-site system.

Operation management system 105 can then transmit one or more communications that facilitate configuring a set of worker threads for the selected operated framework. For example, the communications can cause interfaces to be configured that represent a set of fields for the operation framework, that represent a set of default parameters for the fields, and that accept a new (e.g., modified, customized or overridden) parameter that are to be globally applied across worker fields for each of one or more of the fields.

A parameter-definition interface may be configured to dynamically update based on received input. For example, operation management system 105 (or another system) may have learned from past thread configurations that various parameters are commonly associated with each other. To illustrate, a first server address may be frequently associated with a second server address and/or an IP address. Upon detecting a first parameter for a first field, the interface may be updated to suggest or to define an associated second parameter for a second field. The past thread configurations used for the learning can include configurations at least partly defined by client device 115 and/or based on other definitions, such as definitions provided by one or more other devices associated with a particular tenant in an inter-tenant system. In some instances, access privileges can be specified by (for example) client device 115 or another device that indicates an extent to which to permit configurations defined at least in part by client device 115 to be used for learning parameter associations to be used for client device 115 or for an extent to which to permit configurations defined at least in part by client device 115 to be used for learning parameter associations to be used to present parameter recommendations for other devices. In some instances, access privileges can be specified that indicates an extent to which to permit presenting suggested parameters based on learning performed using configurations defined at least in part by client device 115 or an extent to which to permit presenting suggested parameters based on learning performed using configurations defined at least in part by any other device.

In addition to identifying new (e.g., modified) global parameters, client device 115 can indicate a number of worker threads that are to be generated and can identify lower level modification to parameters. For example, a client device can indicate that fifteen worker threads are to be generated that use default parameters for fields 1, 2 and 4 but that use other (specified) parameters for fields (3 and 5). Operation management system 105 can store (in a parameter modification data store 155) data identifying any new parameter and to which field and worker thread(s) the new parameter corresponds.

A thread manager 160 (e.g., a scheduler) can generate an instance of each worker thread, and a rule evaluator 165 can evaluate each applicable verification rule using each worker thread's parameters. Rule evaluator 165 can track which parameters and which work threads are associated with any error, fault or non-satisfaction of the rule. For example, if a specific parameter is set to a null value when a rule indicates that it is to be set to a non-null value, the field and worker thread associated with the specific parameter can be associated with an error indication. As another example, if a rule indicates that parameters that correspond to a particular field are to be unique across worker threads, and if two parameters are the same, rule evaluator 165 may associate the field and either the two worker threads associated with the two parameters or all worker threads with an error.

In some instances, various types of validation tests or checks may be performed to determine whether to associate a parameter with an error indication. For example, a validation check may include a local validation analysis of one or more parameters of a single worker thread that may be performed without communicating with any remote device. An exemplary local validation analysis may include evaluating whether a parameter conforms with a type constraint (e.g., is an integer, a file location, etc.). As another example, a validation check can include performing a simulated validation using one, more or all parameters of a single worker thread, which can perform a process of the operation framework to determine if a target result is generated and/or whether the process completes without an error. As yet another example, a validation can include assessing multiple parameters across a set of worker threads (e.g., locally). To illustrate, an inter-thread evaluation may determine whether the parameters are globally unique or are globally the same for a given field across all threads. A uniqueness evaluation may be advantageous when (for example) different threads are being configured to perform same operations on different databases. As another illustration, an inter-thread evaluation may evaluate one or more thresholds or statistics, such as determining whether at least one worker thread is associated with a particular parameter for a field or whether no more than three worker threads have a same parameter for a field.

In some instances, determining whether one or more parameters are associated with any error includes evaluating one or more previous thread executions. For example, an error may be indicated when it is determined that at least one (or at least a predefined threshold number) thread execution used the one or more parameters and all of those executions (or at least a predefined percentage) resulted in an error. As another example, an error may be indicated when the one or more parameters include a parameter that is within a range or set that a multi-variable analysis indicates is associated with an error.

In some instances, determining whether one or more parameters are associated with any error includes running a partial portion of the framework (e.g., corresponding to actions that use the one or more parameters), the full framework or a simulated version or test run of the framework—any of which configured in correspondence with the thread. A predefined test input set may be used for this type of preliminary execution. An error may then be indicated for cases where the preliminary execution did not complete, resulted in an error, or produced a result that differed from a predefined result associated with the predefined test input.

In some instances, upon determining that one or more parameters are associated with an error, rule evaluator 165 can identify one or more other parameters for the corresponding fields that are not associated with an error. For example, the one or more other parameters may be identified based on previously successful thread executions or simulated thread executions.

A dot-matrix UI generator 170 can generate a dot-matrix visual element (having specifications thereof stored in a dot-matrix visual element data store 175) that corresponds to the configured worker threads. The dot-matrix visual element can include a matrix of dots (or other elements) or a table of elements (e.g., text or graphic elements), with each row of the matrix representing a worker thread and each column representing a field. Each of one or more visual properties of each dot represents a characteristic of a parameter defined for the corresponding worker thread and field. In some instances, a visual property indicates whether the parameter is defined to be a default parameter for a field or a different parameter. In some instances, a visual property indicates whether any rule is not satisfied at least in part due to the parameter or when the parameter is associated with an error in response to evaluation of a framework-applicable rule. For example, a dot may be colored red when the parameter is associated with an error, blue when the parameter is not associated with an error and also not set to a default value, and gray otherwise. In some instances, a visual property represents the value of the parameter. For example, each non-default parameter for a given field may be assigned a different pattern to be overlaid on the dot, such that a viewer can identify a number of unique parameters for the field. In some instances, text may be overlaid on the dot. The text may identify a current value. In some instances (e.g., when a dot is associated with an error or fault indication), the text may identify a potential alternative parameter value (e.g., associated with other worker threads, past error-free worker-thread executions, or successful worker-thread simulations).

In some instances, the dot-matrix visual element can be interactive, such that the presentation changes based on click or hover associated with a particular part of the visual element. For example, hovering over a dot or a rollover of a dot can cause a value of the corresponding parameter (e.g., corresponding to a field or key-value pair) to be presented. As another example, clicking on a dot can cause an interface to be presented that allows a user to change the parameter and may present potential alternative parameter values (e.g., associated with other worker threads, past error-free worker-thread executions, or successful worker-thread simulations).

Operation management system 105 can transmit the dot-matrix visual element specifications to client device 115, which can display the dot-matrix visual element at display 150. One or more interactive elements can be concurrently displayed (e.g., as part of or near the dot-matrix visual element) and/or can be presented in response to detecting selection of a corresponding link. The interactive elements can be configured to (for example) receive a command to add (and configure) additional worker threads, delete one or more worker threads, adjust one or more parameters of existing worker threads and/or transform the dot-matrix visual element. Upon receiving a command, thread manager 160 may add or delete worker threads, rule evaluator 165 may perform new rule evaluations (e.g., for new or modified worker threads) and/or dot-matrix UI generator 170 can update the dot matrix visual element (e.g., to add or delete rows or adjust visual properties).

As one example, an original dot-matrix visual element may arrange representations of worker threads based on a time at which they were generated and may arrange representations of fields based on a time at which they are used during an operation framework or represented in a process-configuring interface (e.g., wizard) that accepts global definitions for the parameters. A command can correspond to a request to sort representations of worker threads and/or representations of fields so as to cluster dots based on one or more features (e.g., a color of the dots, a shape of the dots, a size of the dots, a pattern with respect to one or more types of visual properties across fields or across worker threads).

Upon receiving a sorting command, a cluster detector 180 can evaluate parameters and/or visual properties of various worker threads and/or fields to identify a new order in which to represent the threads or fields. For example, the cluster detector may perform a cost-function analysis to identify—for each row (or column)—a cost representing a degree to which the dots (or parameters) are different from those from each other row (or column). The rows can then be arranged so as to minimize a total or average cost associated with adjacent rows. As another example, the cluster detector may perform a clustering technique (e.g., principal component analysis, an information-theoretical clustering technique, independent component analysis, pattern-detection clustering technique, etc.) to identify individual clusters of rows (or columns). The rows can then be arranged such that individual clusters' rows are grouped together. Specifications of the dot-matrix visual element can be updated accordingly and transmitted to client device 115, such that the presentation of the matrix can be updated.

Thread manager 160 can (e.g., upon an indication that parameters are finalized and/or that a thread is error-free) generate a code instance (e.g., instances for a first worker thread 185-1, a second worker thread 186, a third worker thread 187, and so on) for each worker thread represented in the dot-matrix visual elements. Generating the code instance can include identifying a set of implementation parameters (e.g., first implementation parameters 195-1, second implementation parameters 196, third implementation parameters 197, and so on) for each of the worker threads. Each set of implementation parameters can include (for example) one or more modified parameters and/or one or more default parameters for any instance where a modified parameter value was not provided. It will be appreciated that the implementation parameters for an individual worker thread are represented in default parameter data store 135-2 and in parameter modifications data store 155 (e.g., in data associated with an identifier of the individual worker thread), such that it need not be independently stored.

In some instances, one or more worker threads are to be executed locally at operation management system 105. The execution may be immediately performed or performed in accordance with a schedule (e.g., which may indicate when the threads are collectively to execute and/or may indicate thread-specific execution timing specifications).

In some instances, one or more worker threads are to be executed remotely from operation management system 105. For example, in the depicted instance, thread execution system(s) 120 is to execute the first worker thread. Operation management system 105 can send the first implementation parameters to thread execution system(s) 120 (e.g., along with an execution instruction), and thread execution system(s) 120 can store the parameters (e.g., in its local implementation parameters data store 195). Thread execution system(s) can further receive the operation framework from operation management system 105 and/or framework management system and store a copy in a local operation framework data store 130-3. Thread execution system(s) can either build its own instance of first worker thread 185-2 using the operation framework and parameters or can further receive a copy of the first worker thread 185-2 from operation management system 105. Thread execution system 120 can then execute the first worker thread using the associated parameters on input data. It will be appreciated that, in some instances, thread execution system(s) 120 includes multiple distributed systems.

It will be appreciated that, in some instances, client device 115 can include one, more or all components depicted to be included in operation management system 105 and/or can perform some or all actions described with respect to operation management system 105. It will also be appreciated that, in some instances, a single system can include both operation management system 105 and framework management system 110.

Figure 3:
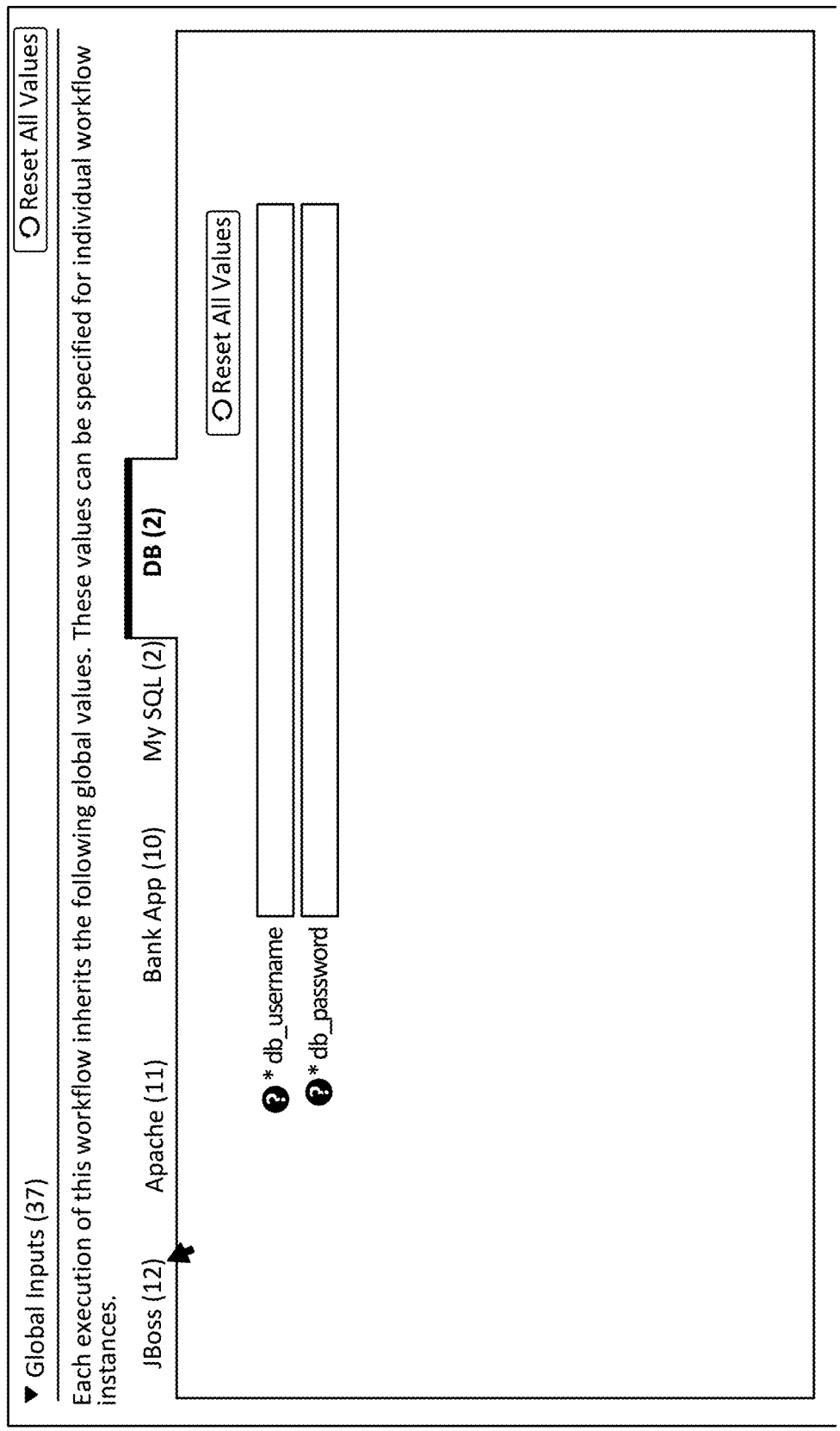

FIGS. 2 and 3 show interfaces for defining parameters for operation execution according to an embodiment of the invention. An operation framework for which worker threads are to be generated can define a set of operations to be performed by each worker thread. The set of operations can be defined to include a number of parameters that may vary across different iterations and/or worker threads. In some instances, upon identifying an operation framework, one or more interfaces are presented that identify the fields and accept, for each field of some or all of the fields, a parameter for the field. Multiple interfaces or visual separations (e.g., section separations) may be used to indicate subsets of the fields that correspond to a particular characteristic (e.g., type of operation, specific operation, type of input data). For example, FIG. 2 shows an interface 200 that identifies fields that correspond to Apache-related operations, and FIG. 3 shows an interface 300 that identifies fields for access authentication for a database.

In exemplary interface 200, for each represented field, a key-value pair can be represented. For example, the representation of the key can include a name 205 of the field. Interface 200 further uses indicators 210 to indicate that a given field is required to have a parameter before execution. A requirement may indicate that a parameter is required before completing a global-definition task, or the requirement may indicate that a parameter is required but can either be defined globally or at a per-thread level (such that a value may remain blank in the global-definition interface). Interface 200 includes a text box 215 to receive input corresponding to a parameter. It will be appreciated that other types of input components (e.g., drop-down list, radio-button list, file-selection tool, etc.) may alternatively or additionally be used. Interface further includes a description option 220 configured to present a description of the field when a cursor is positioned over the visual icon corresponding to the option.

Figure 4:
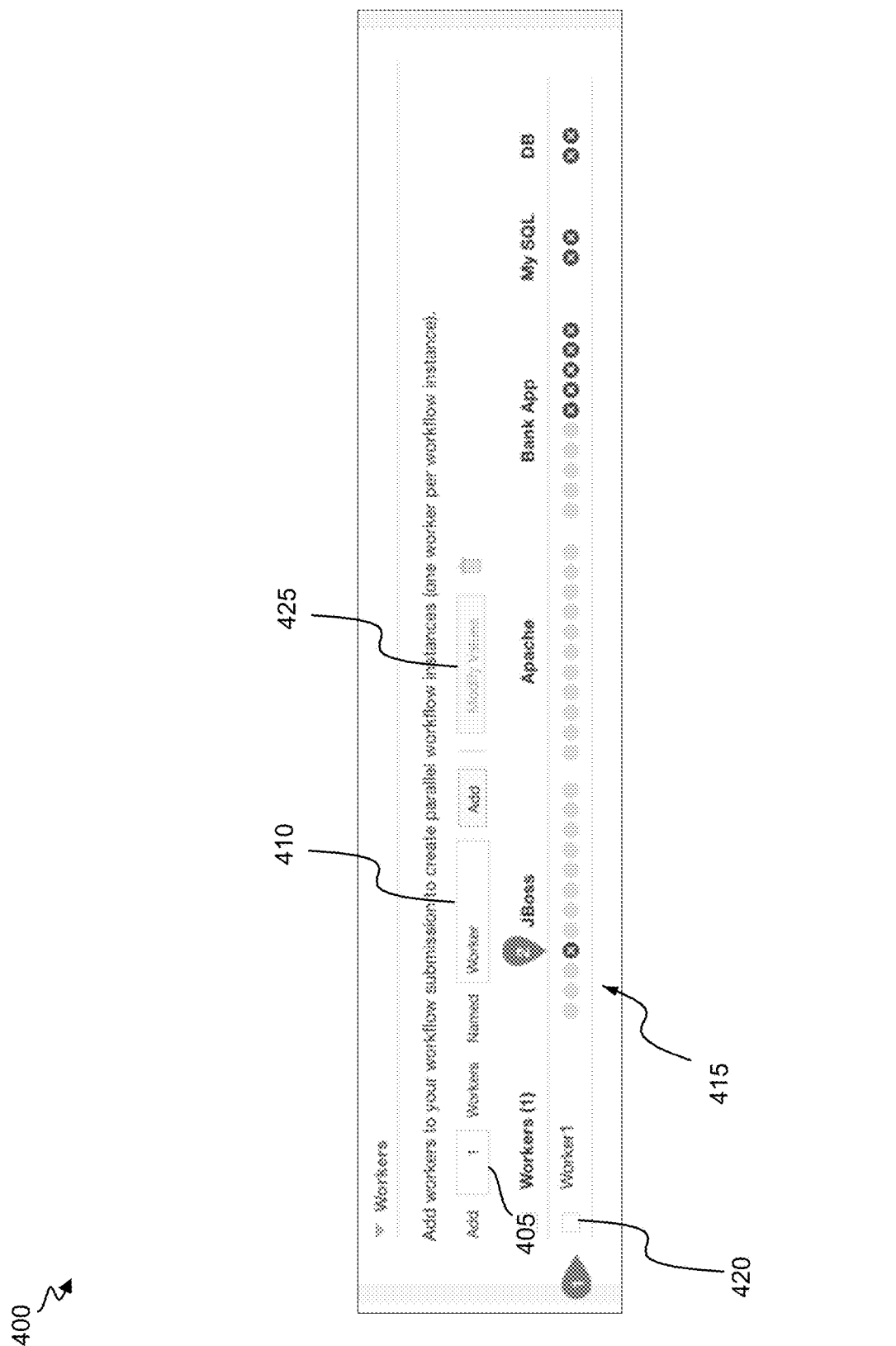
FIG. 4 shows an interface to trigger generation of a worker thread according to an embodiment of the invention.

Thus, a client can quickly and globally set parameters for one or more fields, while operation-related information (e.g., identifying a characteristic of the field, whether it is required, a description) is concurrently presented. Individual worker threads can then be generated and automatically configured with the globally set parameters. FIG. 4 shows an interface 400 to trigger generation of a worker thread according to an embodiment of the invention.

Interface 400 includes a worker-quantity input component 405 that accepts an integer number that specifies how many new worker threads are to be generated. In the depicted instance, the input ("1") indicates that a single worker is to be generated.

A base name for each worker thread can be indicated in a name input component 410. Each worker thread may then be assigned a name that corresponds to the identified name. For example, if five worker threads were to be generated instead of one, they may have names "Worker1", "Worker2", "Worker3", "Worker4" and "Worker5".

Upon selecting the "Add" button, a representation for each of the quantity of worker threads is generated and/or each of the quantity of worker threads can be spun up. Each of the representations can be associated with a worker thread configured with each globally defined parameter. In the depicted instance, a representation 415 of a single worker thread ("Worked") is generated. The representation can include a dot (or other symbol) that corresponds to each of the fields associated with the operation framework. Visual properties of the dots may indicate (for example) a characteristic, value and/or presence of any associated parameter. As one example, a specific visual property (e.g., a specific size, shape selection or color selection) can indicate whether any parameter has been defined for a field, whether it is required that a parameter be defined for a field, whether a currently defined parameter (or lack thereof) is valid (e.g., generally or for the field), etc.

In the depicted instance, red dots with an 'x' overlaid indicates that a given parameter/field is associated with an error. For example, a rule may indicate that a non-null parameter is required for a field, but global definitions may fail to include a non-null parameter. As another example, a rule may identify a range within which the parameter is to fall, and a global definition may identify a parameter outside the range. As yet another example, a rule may identify a format or syntax with which the parameter is to have, but a global definition may identify a parameter that does not have the format or syntax.

Interface 400 includes a thread-selection component 420 that is configured to receive a selection of an individual thread. It will be appreciated that, in instances where multiple worker threads had been generated, thread-selection component 420 may be presented multiple times in association with each worker thread and may allow multiple selections to be concurrently made. Upon selecting one or more threads, a modify-values input component 425 may become active. When clicked, an interface may be presented that indicates current parameters and can receive new parameter values.

FIG. 5 shows an interface 500 that represents worker-thread parameters according to an embodiment of the invention. In contrast to the example in FIG. 4, a dot-matrix visual element 515 represented in FIG. 5 includes eleven workers.

Interface 500 further includes a resizing element 530. In the depicted example, resizing element 530 is configured to receive input that adjusts a general zoom that applies both to a first axis or dimension along with worker threads are represented and a second axis or dimension along which fields are represented. It will be appreciated that one or more resizing elements may instead specifically apply to a single axis or dimension.

Dot-matrix visual element 515 includes a single differentially colored dot 535. A visual property (e.g., the blue color) may indicate that the parameter is different as compared to a default or global parameter value for the corresponding field. A particular type of action (e.g., hovering a cursor on the dot or clicking on the dot) may trigger an identification of the parameter to be displayed.

Figure 6:
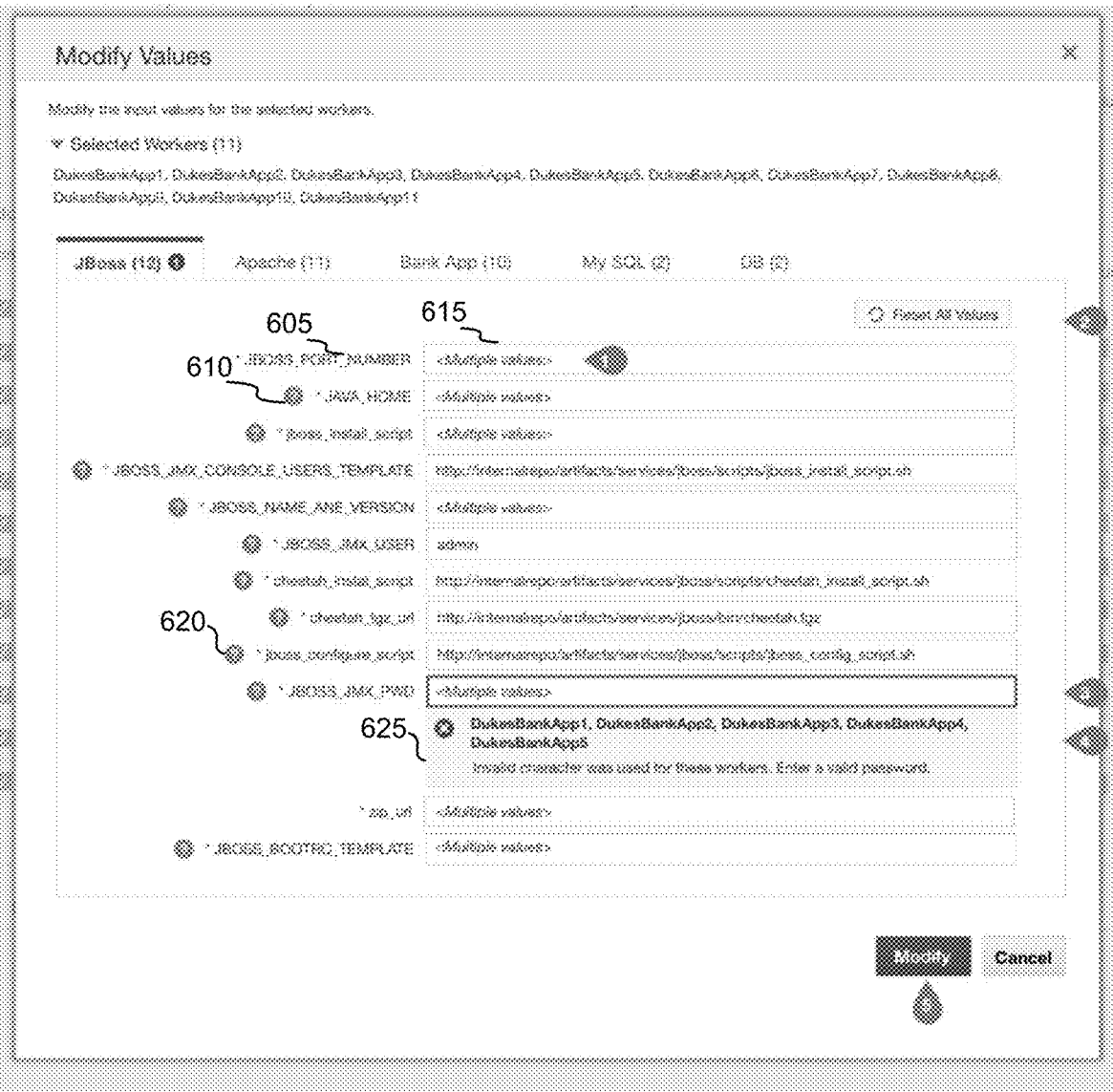
FIG. 6 shows an interface to modify parameters across a set of worker threads according to an embodiment of the invention.

FIG. 6 shows an interface 600 to modify parameters across a set of worker threads according to an embodiment of the invention. For example, interface 600 may be selected in response to receiving an input at interface 500 that corresponds to a selection of all threads and a request to modify values.

Interface 600 presents a subset of the fields that are associated with the applicable operation framework. Specifically, twelve fields that are associated with the JBoss category are shown. Other fields may be presented in response to a selection of another category. As in interface 200 shown in FIG. 2, interface 400 can include a name for each field 605, an indicator 610 that indicates that given field is required, a text box 615 (or other input component) to receive input corresponding to a parameter, and a description option 620.

However, in interface 600, text box 615 can identify a current parameter value defined for the selected worker thread(s). In the depicted instance, when multiple of the selected worker threads have different parameters for a given field, a corresponding text box represents the diverse values by indicating that there are multiple values, thereby masking the actual different values. It will be appreciated that masking the values can include may alternatively or additionally include a blank space or object in a value, blurring a list of values, etc. In other instances, each of the parameters may be listed or accessible through a different mechanism (e.g., pull-down list). When each of the selected worker threads has a same parameter for a given field, the parameter is presented in interface 600.

Interface 600 also includes an error alert 625 that indicates that one or more of the parameter(s) for selected worker threads were associated with an error. In this depiction, error alert 625 identifies each worker thread associated with the error and the reason for the error. A new parameter can then be entered into the associated text box and applied to all of the selected worker threads. Thus, interface 600 can facilitate bulk modification to worker thread configurations. In some instances, interface 600 may automatically update to indicate whether the error remains applicable based on the new parameter.

In some instances, interface 600 can identify a recommended parameter for a given field. For example, if different worker threads were associated with different parameters for a given field, and if only one or an incomplete subset of the parameters were valid, interface 600 may present one (or all) of the valid parameters. As another example, interface 600 may present a value learned to be associated with the field. In some instances, interface 600 presents a hint of a parameter. For example, the hint may identify a syntax required for the field.

Figure 7:
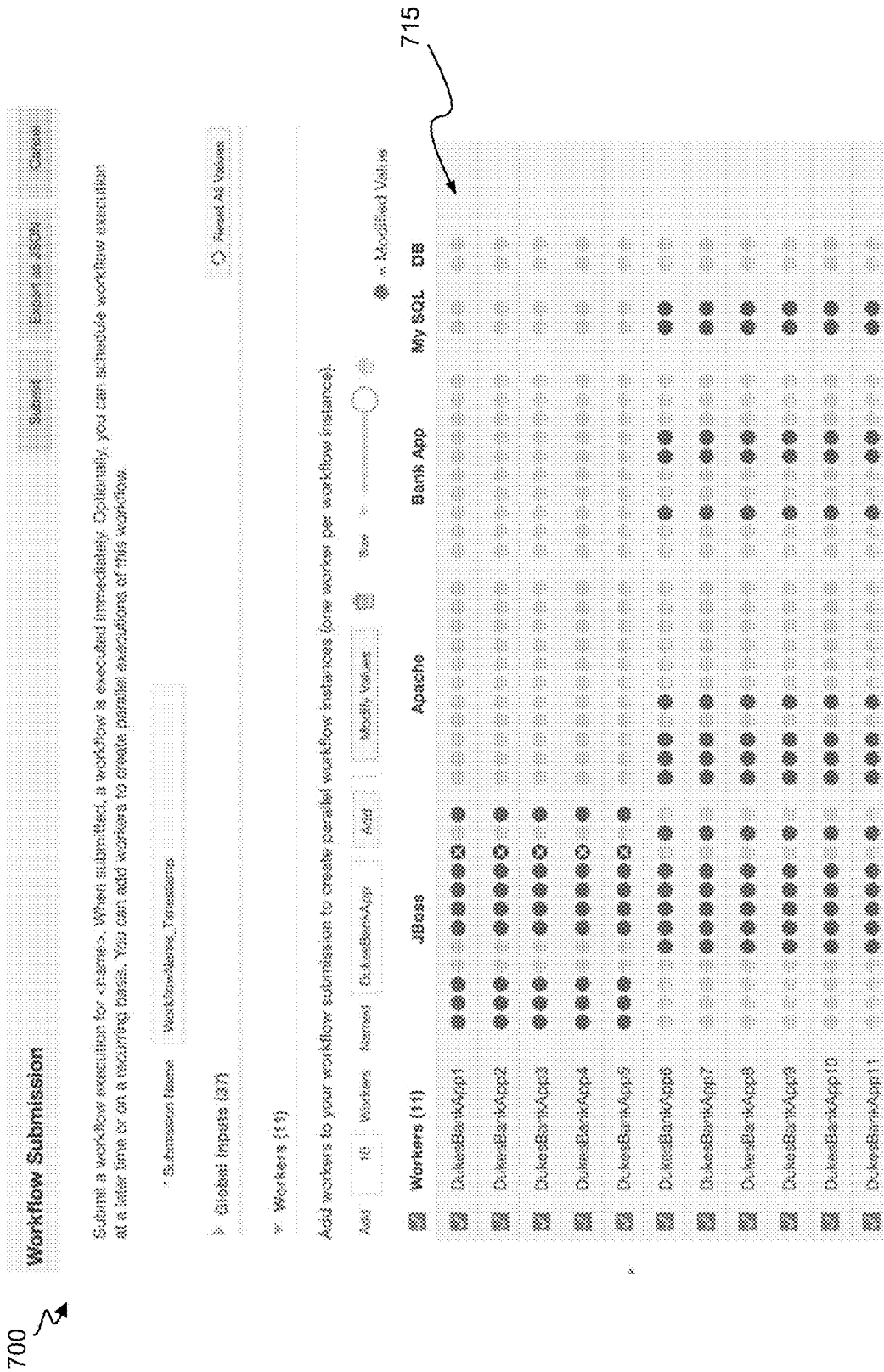
FIG. 7 shows a dot-matrix visual element representing worker-thread parameters according to an embodiment of the invention.

FIG. 7 shows an interface 700 that includes a dot-matrix visual element 715 representing worker-thread parameters according to an embodiment of the invention. The representation of dot-matrix visual element 715 in FIG. 7 shares visual characteristics with the representation of dot-matrix visual element 515 in FIG. 5. For example, the number of rows and columns, worker threads' names and field names are consistent across FIGS. 5 and 7. However, the representation in FIG. 7 includes blue dots indicating that, with regard to some of the represented pairs of worker threads and fields, a parameter for the worker thread and field has been modified from a default or global value (e.g., in a manner that has not triggered an error alert).

Depicted dot-matrix visual element 715 indicates that there are two patterns with respect to visual properties of the dots across fields. Specifically, the first five worker threads are associated with a first pattern, and the last six worker threads are associated with a different second pattern. Each pattern can indicate—with respect to each field—a visual property of a corresponding dot, and the pattern can include an ordered representation of the visual properties. The differential patterns may have arisen as a result of differentially bulk-editing the two sets of worker threads.

Each worker thread's dots (and/or an associated pattern of the dots) can be represented by integers or other symbols (e.g., such that gray dots are represented with a "0", blue dots are represented with a "1", and red dots are represented with a "2"). A clustering or pattern-segregation technique may be used to identify worker threads associated with same or similar patterns. In some instances, representations of worker threads can be ordered (e.g., automatically or in response to a sorting command) to group representations of threads associated with same or similar patterns or to order thread representations based on a pattern-similarity assessment or pattern characteristic (e.g., fraction or number of non-gray dots and/or a left-to-right skew of each of one, more or all types of non-gray dots).

Figure 8:
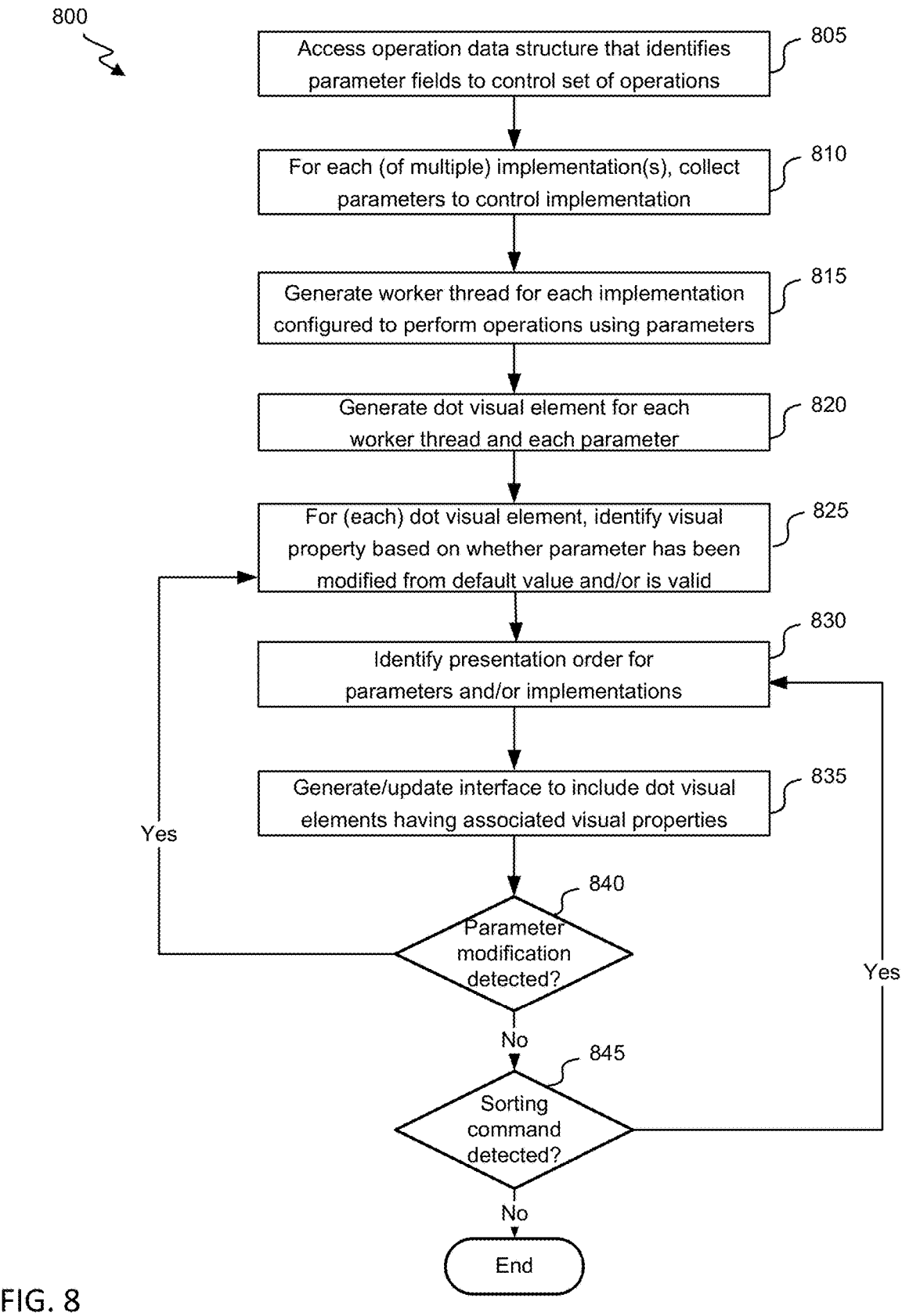
FIG. 8 shows a flowchart for a process for using a dot-matrix visual element to facilitate configurations of individual worker threads according to an embodiment of the invention.

FIG. 8 shows a flowchart for a process 800 for using a dot-matrix visual element to facilitate configurations of individual worker threads according to an embodiment of the invention. Part or all of process 800 may be performed (for example) by an operation management system.

Process 800 begins at block 805 where an operation data structure is accessed that identifies a set of parameter fields to control a set of operations. For example, the operation data structure may be retrieved from a local data store or requested from a remote data store. The operation data structure may correspond to an operation framework and may be accessed (for example) in response to receiving a selection or identification of an operation framework (e.g., from amongst multiple operation frameworks). The operation data structure may identify an ordered set of actions to be performed on input data. Each of some or all of the set of actions may include one or more configurable fields for which parameters can be separately defined for each instance or implementation.

Thus, at block 810, for each of one or more implementations of the operation framework, a set of parameters can be collected to control the implementation. The collection may include identifying globally defined parameters. The collection may alternatively or additionally include determining that a parameter is to be defined to be a null value (e.g., as a result of having no global definition indicated for the field).

At block 815, a worker thread is generated for each implementation. The worker thread may correspond to a piece of code that is configured with the collected parameters to perform the set of operations. In some instances, the generation corresponds to a preliminary action. For example, the worker thread generated at block 815 may include a representation of a thread or code that is not in a location, is not compiled, is not accessing data or is otherwise configured so as not to be fully executable or configured for full operation. A quantity of worker threads that is generated may be determined based on (for example) input from a client device or a default setting.

At block 820, a dot visual element is generated for each pair-wise combination of the collected parameters and the worker threads. The dot visual element can include a graphical element that can be configured to have or be associated with multiple visual properties. The dot visual element may include a circular visual element or may be of another shape.

At block 825, one or more visual properties is identified for each dot visual element. The visual properties can include (for example) a fill color, an outline color, a size, a shape, a texture, overlaid text of image (or whether overlaid text or an overlaid image is presented), and so on. The one or more visual properties can be identified based on the parameter. For example, the one or more visual properties can be identified based on whether the parameter is the same as a global parameter for the associated field and/or whether the parameter is associated with any error (or whether any error has been attributed to the parameter).

At block 830, a presentation order is identified for the fields (corresponding to the parameters) and/or for the worker threads. The presentation order can be identified (for example) based on an order in which the worker threads were generated, an order in which fields are identified within an operation framework, an order in which fields are represented within an interface for globally defining values, an order defined based on input from a client device or framework management system, and so on. In some instances, an order is identified based on a technique for detecting patterns (e.g., across fields and/or across worker threads), grouping patterns and/or ordering patterns. In some instances, the order sequentially clusters worker threads that are associated with, for one or more fields, shapes having similar visual properties. Similar visual properties can include (for example) same visual properties and/or properties within a specified or learned range from clustering values. For example, a set of worker threads may collectively identify four parameters for a given field. The worker-thread representations may be sorted such that worker threads associated with a first of the four parameters are clustered together, followed by worker threads associated with a second of the four parameters, and so on. Representations of the visual properties for the field, may be similar within each of the four groups but different across the groups. In some instances, the visual properties vary within a given range or so as to correspond to a given variability that is at least (for example) 1.5, 2, 3, or 5 times smaller than the range of variability across all of the worker threads.

At block 835, an interface is generated or updated to include a dot-matrix visual element that includes each of the generated dots. Each of the generated dots can be presented in accordance with any associated visual property. The dot-matrix visual element can extend along multiple dimensions. For example, different worker threads may be represented along a vertical dimension, and different fields may be represented along a horizontal dimension. Each dot can be positioned so as to represent its correspondence with a specific thread and field (e.g., at a horizontal position corresponding to a given field and at a vertical position corresponding to a given thread). The interface can then be transmitted or presented (e.g., via a webpage).

At block 840, it can be determined whether any parameter modification or new parameter definition has been detected. For example, such a detection may include detecting that a user has interacted with the interface to select a given dot (e.g., specifically or one defined within a group of dots associated with a set of fields and/or set of worker threads) and to provide a new parameter value for the dot. If a new or modified parameter is detected, process 800 can return to block 825 to identify a visual property for the dot(s) associated with the new or modified parameter. The dot-matrix visual element can then be updated to accord with the new visual property/properties. The updated dot-matrix can be transmitted or presented in a refreshed screen (e.g., via a webpage). It will be appreciated that the visual property need not change (e.g., depending on rules that define the visual property definitions and any old and the new value of the parameter).

If a new or modified parameter is not detected, process 800 continues to block 845 where it is determined whether a sorting command has been detected. For example, the interface that includes the dot-matrix visual element can also include a sorting-command input component configured to receive one or more sorting commands. The sorting command may indicate (for example) that the fields and/or threads are to be ordered in accordance with a particular technique and/or based on a particular variable. If a sorting command has been detected, process 800 can return to block 830, such that a new representation order is identified. Generating the new representation may include (for example) identifying clusters of worker threads based on parameters or visual properties and co-locating the worker threads within individual clusters. Generating the new representation may include (for example) identifying clusters of fields based on parameters or visual properties and co-locating the fields within clusters. Generating the new representation may include (for example) detecting patterns and co-locating worker threads having similar or same patterns. Generating the new representation may include (for example) ordering worker threads based on parameter values for a given field (e.g., in an alphabetical or numeric order). The dot-matrix visual element can then be updated to accord with the new representation. The updated dot-matrix can be transmitted or presented in a refreshed screen (e.g., via a webpage).

It will be appreciated that various alternative embodiments to process 800 are contemplated. For example, after any of blocks 835, 840 or 845, a communication or interaction may be received that corresponds to an instruction to spin up additional worker threads. Process 800 may then return to block 815, such that one or more new worker threads are generated and the dot-matrix visual element is updated to represent the new worker threads. In some instances, the dot-matrix visual element is scaled in a particular dimension (e.g., vertically) to facilitate representing the new total number of worker threads within a same or space length along the dimension. Similar adjustments may be performed in response to detecting a thread-deletion instruction. In some instances, an interface may instead represent up to a particular number of worker threads (or fields) along a particular dimension and can include an input component (e.g., arrow or slider) to receive an instruction to shift the view to present other worker threads (or fields) on a screen.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for representing operation configurations via dot-matrix visual elements, the computer-implemented method comprising:
 accessing an operation data structure that identifies a set of fields for which corresponding parameters are to at least partly control a sequenced set of operations;
 for each implementation of multiple implementations of the sequenced set of operations:
  collecting, for each field of the set of fields, a parameter for the field that is to be used to at least partly control the implementation; and
  generating a worker thread configured to perform the implementation in accordance with the collected parameters;
 generating a dot-matrix visual element that includes a set of shapes, wherein, for each shape of the set of shapes:
  a first position of the shape along a first dimension is indicative of a particular worker thread with which the shape corresponds;
  a second position of the shape along a second dimension is indicative of a particular field with which the shape corresponds; and
  a visual property of the shape indicates:
   whether or not a parameter associated with the particular worker thread and with the particular field is valid;
   whether or not the parameter is a default value; or
   whether or not a parameter associated with the particular worker thread and with the particular field is valid and whether or not the parameter is a default value;
 wherein at least one shape of the set of shapes is selectable to cause display of an interface for changing the parameter associated with the particular worker thread of the at least one shape and with the particular field of the at least one shape, and outputting the dot-matrix visual element.

2. The method of claim 1, wherein a particular shape in the set of shapes is clickable, and wherein the method further comprises:
 detecting a click input corresponding to the particular shape;
 outputting an interface that identifies the parameter associated with the particular shape;
 receiving, via the interface, a modification input that includes a new parameter;
 updating the dot-matrix visual element to indicate:
  that the new parameter is a modification from the default value; and/or
  whether or not the new parameter is valid for the field corresponding to the particular shape;
 outputting the updated dot-matrix visual element.

3. The method of claim 1, wherein each of at least one shape in the set of shapes indicates whether or not input has been provided, via an interaction with a process-configuring interface, that includes a value to which the parameter is to be set.

4. The method of claim 1, wherein collecting includes:
 receiving one or more inputs collected during a process-configuring communication exchange; and
 defining, for each field of at least some of the set of fields and based on the one or more inputs, the parameter for the field that is to be used to at least partly control the sequenced set of operations for the implementation, the parameter being defined to be equal to a default value for the field or to a parameter identified via the one or more inputs;
 wherein the first dimension is a vertical dimension, such that each row in the dot-matrix visual element corresponds to a different worker thread configured during the process-configuring communication exchange.

5. The method of claim 1, further comprising:
 detecting a selection input that corresponds to a subset of the set of fields;
 determining, for each field of the set of fields, whether or not the generated worker threads share a parameter for the field;
 generating an interface component that, for each field of the subset of the set of fields:
  identifies the field;
  when the generated worker threads share a particular parameter for the field, identifies the particular parameter;
  when the generated worker threads correspond to different particular parameter for the field, includes a mask of the different particular parameters that correspond to the field and the generated worker threads; and
  includes an input component configured to receive a definition for the parameter for the field;
 outputting the interface component;
 detecting an interaction with the input component that corresponds to a specification of another particular parameter for a particular field of the subset of the set of fields;
 reconfiguring each worker thread of the generated worker threads based on the other particular parameter;
 updating the dot-matrix visual element based on the other particular parameter such that each shape corresponding to the particular field and the generated worker threads include a same visual appearance; and
 outputting the updated dot-matrix visual element.

6. The method of claim 1, further comprising:
 detecting a selection input that corresponds to a subset of the generated worker threads, the selection input including a selection of two or more shapes that are associated with the subset of the generated worker threads or a selection of the subset of the generated work threads;
 generating an interface component that, for each of at least one of the set of fields:
  identifies the field; and
  includes an input component configured to receive a definition for the parameter for the field;
 outputting the interface component;
 detecting an interaction with the input component that corresponds to a specification of a particular parameter for a particular field of the set of fields;
 reconfiguring each worker thread of the subset based on the particular parameter;
 updating the dot-matrix visual element based on the particular parameter such that each shape corresponding to the particular field and the subset of the generated worker threads include a same visual appearance; and
 outputting the updated dot-matrix visual element.

7. The method of claim 6, further comprising:
 identifying the at least one of the set of fields, wherein, for each field of the at least one of the set of fields, each of the set of shapes that is associated with the field and the subset of the generated worker threads correspond to a shared parameter;

wherein the interface component masks one or more definitions for the parameter associated with another at least one of the set of fields, wherein, for each field of the other at least one of the set of fields, each of the shapes associated with the field and the subset of the generated worker threads correspond to different parameter.

8. The method of claim 1, further comprising:
determining that representations of worker threads across the first dimension are to be clustered to spatially aggregate representations of subsets of worker threads that have similar cross-field patterns in visual properties of corresponding shapes, wherein the determination is made based on detection of a clustering sorting command or based on a default ordering technique; and
in response to the determination:
identifying an order in which the worker threads are to be represented in the dot-matrix visual element, wherein the order sequentially clusters worker threads that are associated with, for one or more fields of the set of fields, shapes having similar visual properties;
wherein the generation of or a transformation of the dot-matrix visual element is performed such that individual subsets of the set of shapes are repositioned along a the first dimension in accordance with the order, each of the individual subsets corresponding to a single worker thread and to the set of fields.

9. The method of claim 1, further comprising:
determining that representations of the set of fields across the second dimension are to be clustered to spatially aggregate representations of subsets of the generated worker threads that have similar cross-threads patterns in visual properties of corresponding shapes, wherein the determination is made based on detection of a clustering sorting command or based on a default ordering technique; and
in response to the determination:
performing a population analysis across the generated worker threads to identify fields within the set of fields that are associated with shapes having similar visual properties;
wherein the generation of or a transformation of the dot-matrix visual element is performed to spatially aggregate shapes corresponding to the identified fields along the second dimension.

10. The method of claim 1, further comprising:
determining that representations of the set of fields across the second dimension are to arranged to correspond with an order in which the set of fields are identified within a process-configuring communication exchange, wherein the determination is made based on detection of a temporal sorting command or based on a default ordering technique; and
wherein the generation of or a transformation of the dot-matrix visual element is performed to represent the set of fields in accordance with the order.

11. The method of claim 1, further comprising:
accessing a global-verification rule that pertains to a particular field of the set of fields, wherein the global-verification rule specifies a condition relating to one or more candidate shapes that pertain to same or different fields and same or different worker threads, and wherein a particular visual property of a particular shape indicates whether or not the condition was satisfied for a particular instance of a particular value of the particular shape and one or more other instances of one or more values of one or more other shapes;
collecting a cross-implementation group of parameters for the particular field, each parameter within the cross-implementation group corresponding to a different implementation of the multiple implementations; and
determining, based on the cross-implementation group of parameters, whether or not the global-verification rule is satisfied, wherein the dot-matrix visual element is generated such that each shape in the set of shapes that corresponds to the particular field visually indicates whether or not the global-verification rule is satisfied.

12. The method of claim 1, wherein the visual property includes a color, pattern, shape or size.

13. The method of claim 1, wherein each shape of the set of shapes includes a dot that includes a circular perimeter and inner area.

14. A computer-program product tangibly embodied in a non-transitory machine-readable storage medium, including instructions configured to cause one or more data processors to perform actions including:
accessing an operation data structure that identifies a set of fields for which corresponding parameters are to at least partly control a sequenced set of operations;
for each implementation of multiple implementations of the sequenced set of operations:
collecting, for each field of the set of fields, a parameter for the field that is to be used to at least partly control the implementation; and
generating a worker thread configured to perform the implementation in accordance with the collected parameters;
generating a dot-matrix visual element that includes a set of shapes, wherein, for each shape of the set of shapes:
a first position of the shape along a first dimension is indicative of a particular worker thread with which the shape corresponds;
a second position of the shape along a second dimension is indicative of a particular field with which the shape corresponds; and
a visual property of the shape indicates:
whether or not a parameter associated with the particular worker thread and with the particular field is valid;
whether or not the parameter is a default value; or
whether or not a parameter associated with the particular worker thread and with the particular field is valid and whether or not the parameter is a default value;
wherein at least one shape of the set of shapes is selectable to cause display of an interface for changing the parameter associated with the particular worker thread of the at least one shape and with the particular field of the at least one shape, and outputting the dot-matrix visual element.

15. The computer-program product of claim 14, wherein a particular shape in the set of shapes is clickable, and wherein the actions further include:
detecting a click input corresponding to the particular shape;
outputting an interface that identifies the parameter associated with the particular shape;
receiving, via the interface, a modification input that includes a new parameter;
updating the dot-matrix visual element to indicate:
that the new parameter is a modification from the default value; and/or whether or not the new parameter is valid for the field corresponding to the particular shape;

outputting the updated dot-matrix visual element.

16. The computer-program product of claim 14, wherein each of at least one shape in the set of shapes indicates whether or not input has been provided, via an interaction with a process-configuring interface, that includes a value to which the parameter is to be set.

17. The computer-program product of claim 14, wherein collecting includes:

receiving one or more inputs collected during a process-configuring communication exchange; and defining, for each field of at least some of the set of fields and based on the one or more inputs, the parameter for the field that is to be used to at least partly control the sequenced set of operations for the implementation, the parameter being defined to be equal to a default value for the field or to a parameter identified via the one or more inputs;

wherein the first dimension is a vertical dimension, such that each row in the dot-matrix visual element corresponds to a different worker thread configured during the process-configuring communication exchange.

18. The computer-program product of claim 14, wherein the actions further include:

detecting a selection input that corresponds to a subset of the set of fields;

determining, for each field of the set of fields, whether or not the generated worker threads share a parameter for the field;

generating an interface component that, for each field of the subset of the set of fields:

identifies the field;

when the generated worker threads share a particular parameter for the field, identifies the particular parameter;

when the generated worker threads correspond to different particular parameter for the field, includes a mask of the different particular parameters that correspond to the field and the generated worker threads; and includes an input component configured to receive a definition for the parameter for the field;

outputting the interface component;

detecting an interaction with the input component that corresponds to a specification of another particular parameter for a particular field of the subset of the set of fields;

reconfiguring each worker thread of the generated worker threads based on the other particular parameter;

updating the dot-matrix visual element based on the other particular parameter such that each shape corresponding to the particular field and the generated worker threads include a same visual appearance; and outputting the updated dot-matrix visual element.

19. The computer-program product of claim 14, wherein the actions further include:

detecting a selection input that corresponds to a subset of the generated worker threads, the selection input including a selection of two or more shapes that are associated with the subset of the generated worker threads or a selection of the subset of the generated work threads;

generating an interface component that, for each of at least one of the set of fields:

identifies the field; and includes an input component configured to receive a definition for the parameter for the field;

outputting the interface component;

detecting an interaction with the input component that corresponds to a specification of a particular parameter for a particular field of the set of fields;

reconfiguring each worker thread of the subset based on the particular parameter;

updating the dot-matrix visual element based on the particular parameter such that each shape corresponding to the particular field and the subset of the generated worker threads include a same visual appearance; and outputting the updated dot-matrix visual element.

20. A system comprising:

one or more data processors; and a non-transitory computer readable storage medium containing instructions which when executed on the one or more data processors, cause the one or more data processors to perform actions including:

accessing an operation data structure that identifies a set of fields for which corresponding parameters are to at least partly control a sequenced set of operations;

for each implementation of multiple implementations of the sequenced set of operations:

collecting, for each field of the set of fields, a parameter for the field that is to be used to at least partly control the implementation; and generating a worker thread configured to perform the implementation in accordance with the collected parameters;

generating a dot-matrix visual element that includes a set of shapes, wherein, for each shape of the set of shapes:

a first position of the shape along a first dimension is indicative of a particular worker thread with which the shape corresponds;

a second position of the shape along a second dimension is indicative of a particular field with which the shape corresponds; and a visual property of the shape indicates:

whether or not a parameter associated with the particular worker thread and with the particular field is valid;

whether or not the parameter is a default value; or whether or not a parameter associated with the particular worker thread and with the particular field is valid and whether or not the parameter is a default value;

wherein at least one shape of the set of shapes is selectable to cause display of an interface for changing the parameter associated with the particular worker thread of the at least one shape and with the particular field of the at least one shape, and outputting the dot-matrix visual element.

* * * * *

UNITED STATES PATENT AND TRADEMARK OFFICE
CERTIFICATE OF CORRECTION

PATENT NO. : 10,579,167 B1  
APPLICATION NO. : 16/102492  
DATED : March 3, 2020  
INVENTOR(S) : Theisen et al.

Page 1 of 1

It is certified that error appears in the above-identified patent and that said Letters Patent is hereby corrected as shown below:

In the Specification

In Column 4, Line 19, delete "of the of the" and insert -- of the --, therefor.

In Column 6, Line 6, delete "store store" and insert -- store --, therefor.

In Column 7, Line 11, delete "work threads" and insert -- worker threads --, therefor.

In Column 10, Line 12, delete "distributcd" and insert -- distributed --, therefor.

In the Claims

In Column 18, Line 45, in Claim 6, delete "work threads;" and insert -- worker threads; --, therefor.

In Column 19, Line 27, in Claim 8, before "first" delete "the".

In Column 19, Line 50, in Claim 10, delete "are to arranged" and insert -- are arranged --, therefor.

In Column 22, Line 3, in Claim 19, delete "work threads;" and insert -- worker threads; --, therefor.

Signed and Sealed this  
Twenty-seventh Day of October, 2020

Andrei Iancu  
*Director of the United States Patent and Trademark Office*